Oct. 20, 1953 M. A. WECKERLY 2,656,142
PROPORTIONING SCALE
Filed March 26, 1952 3 Sheets-Sheet 1
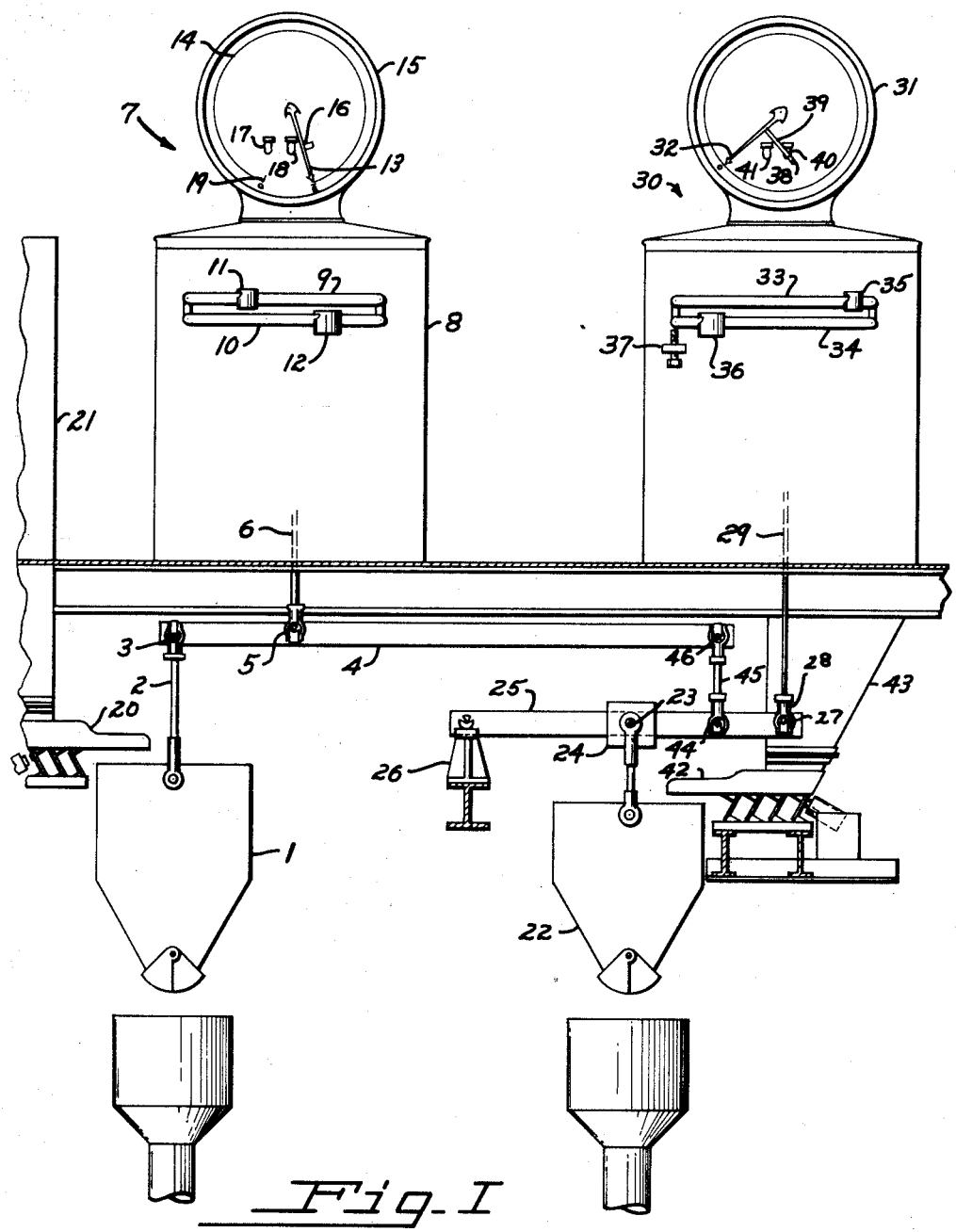
Fig. I
Inventor
MARK A. WECKERLY
By Marshall & Marshall
Attorneys

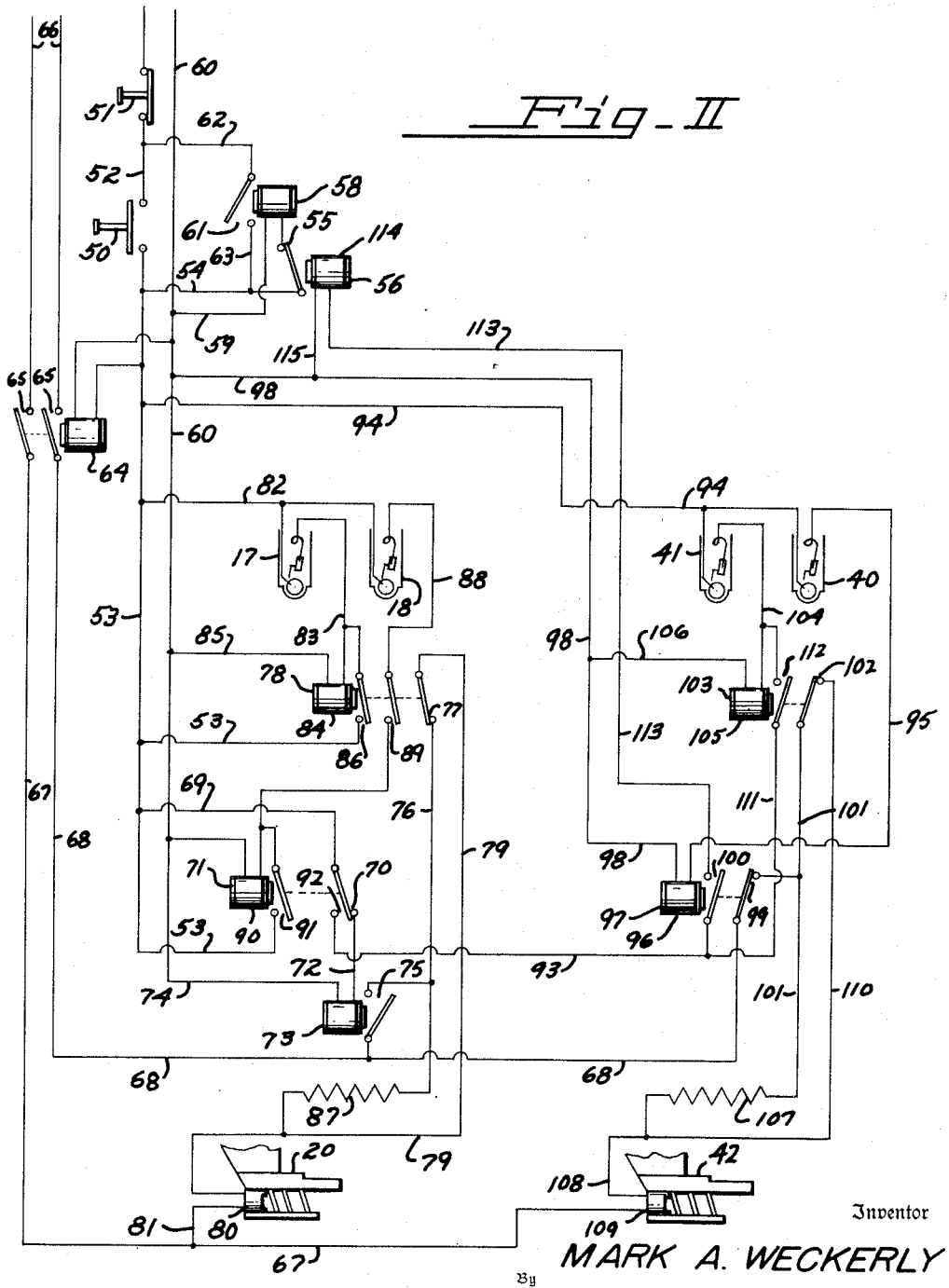

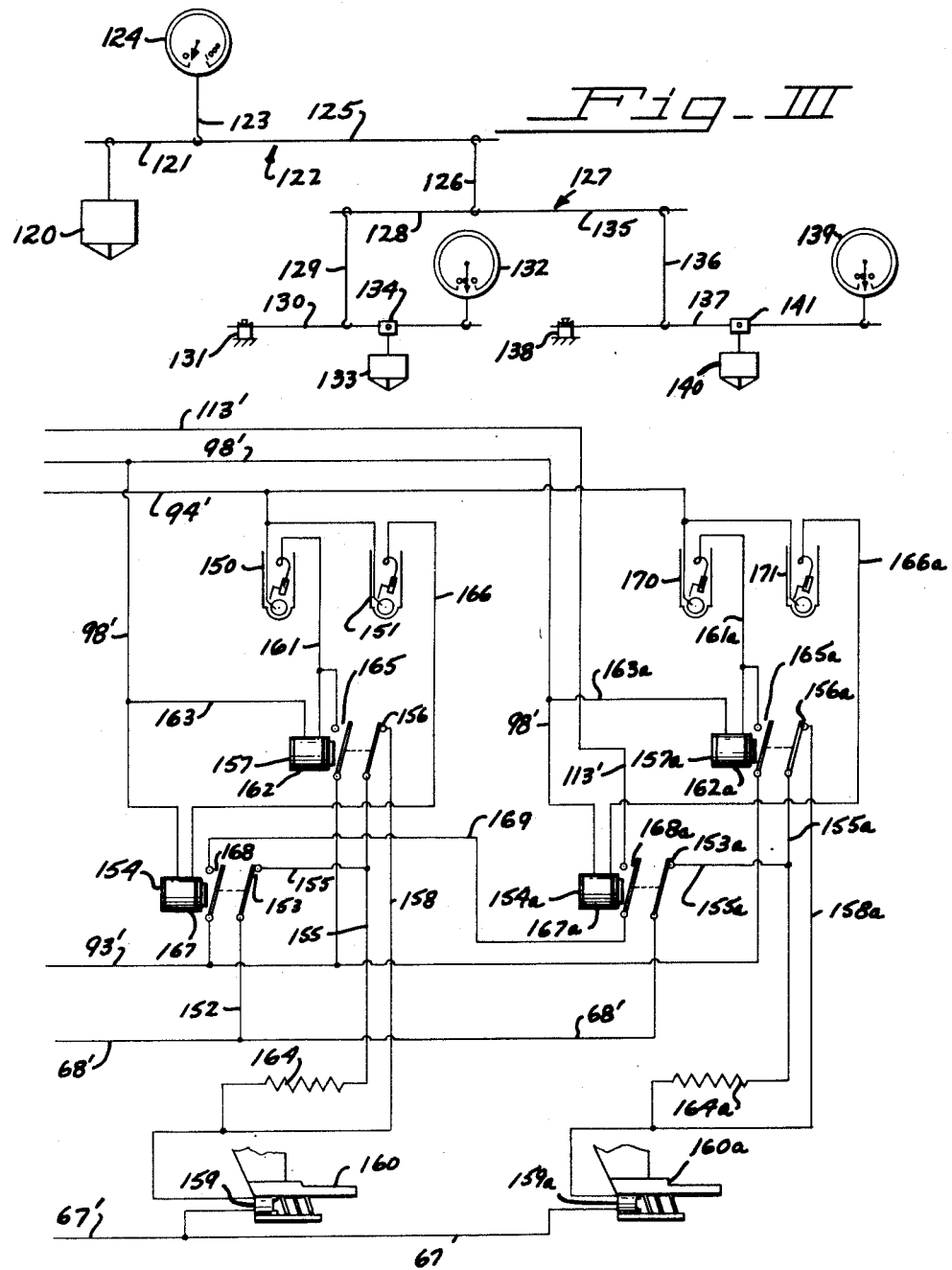

Patented Oct. 20, 1953

2,656,142

UNITED STATES PATENT OFFICE 2,656,142

PROPORTIONING SCALE

Mark A. Weckerly, Toledo, Ohio, assignor to Toledo Scale Company, Toledo, Ohio, a corporation of New Jersey Application March 26, 1952, Serial No. 278,543

7 Claims. (Cl. 249—14)

This invention relates to weighing scales and in particular to a system of weighing scales for weighing out batches of material each batch being composed of several ingredients which enter into the batch in definite proportions according to weight.

It often happens in batching operations that the size of the batch may vary between wide limits whereas the proportions of the ingredients entering into the batch must be maintained within very close limits. An example of this condition is found in the mixing of concrete where the quantity of concrete required may vary widely according to the estimate of the job but where the proportions must be exact to maintain the quality of the product.

It also often happens that one ingredient for a mixture is a chunky material or one difficult to feed in a steady controlled stream. If such a condition occurs the amounts of evenly easily fed materials may be automatically varied according to the actual weight of the chunky material introduced into the particular batch.

The principal object of this invention is to provide a system of interconnected weighing scales for producing batches of various sizes wherein the proportions are maintained with high precision regardless of the size of the batch.

A further object of the invention is to provide a system of interconnected weighing scales and an associated control suitable for automatically measuring out the ingredients for a batch wherein the weight of a first ingredient is employed as a counterbalance and the control mechanism automatically weighs out amounts of the other ingredients equal to fixed percentages by weight of the first ingredient.

More specific objects and advantages are apparent from the following description of a preferred embodiment of the invention.

According to the invention a weighing scale system is provided with two or more load receivers arranged so that a first weighing scale indicator indicates the load in a first load receiver and a second weighing scale indicator indicates the condition of balance between the load in a second load receiver and the load in the first load receiver acting as a counterforce. Automatic controls are provided for sensing the condition of balance of the weighing scale system and controlling feeding apparatus for feeding batch materials into the load receivers to bring the system into balance and maintain the system in balance.

In carrying out the invention the load receivers for a first and second commodity are, in effect, supported on the ends of a floating lever the fulcrum of which is supported by a first load counterbalancing and indicating mechanism. One end of the floating lever is also operatively connected to a second load counterbalancing mechanism which serves as an over-and-under indicator to indicate the condition of balance between the loads applied to the ends of the floating lever. In an actual weighing scale a force multiplying lever system is included between at least one of the load receivers and the floating lever and the multiplying lever system is made adjustable so that the proportionality between the weights of the batch ingredients may be varied.

Since the fulcrum pivot of a weighing scale lever is always subjected to a force that is proportional to the force being transmitted through the lever, the first load counterbalancing mechanism supporting the fulcrum of the floating lever indicates the force being transmitted through the lever and thus may be employed to automatically control the weight of the batch being compounded.

A preferred embodiment of the invention is illustrated in the accompanying drawings.

In the drawings:

Figure I is a schematic elevation of a weighing scale system adapted to weigh out materials in a predetermined proportion for batches of various sizes.

Figure II is a schematic wiring diagram of the control mechanism for the feeders illustrated in Figure I.

Figure III is a diagrammatic representation of a lever system for compounding batches of three ingredients.

Figure IV is a schematic diagram illustrating the extension of the diagram of Figure II to include the control for the third feeder.

These specific figures and the accompanying description are intended merely to illustrate the invention but not to impose limitations on the claims.

A batching system constructed according to the invention comprises a first load receiver or hopper 1 which is pivotally supported by a link 2 from an end pivot 3 of a floating lever 4. The lever 4, of the first class, has a fulcrum pivot 5 supported from a steelyard rod 6 leading to a first weighing scale 7. The weighing scale 7 comprises a cabinet 8 housing a lever system which includes a pair of beams 9 and 10 carrying poises 11 and 12 adapted to counterbalance loads applied through the steelyard rod 6. The weighing scale 7 also includes an automatic load counterbalancing mechanism which may be either a pendulum or a spring arranged to rotate and indicator 13 according to loads being counterbalanced. The indicator 13 cooperates with an annular chart 14 housed within a generally watchcase-shaped housing 15 to indicate the magnitude of the load counterbalanced by the automatic mechanism.

The indicator 13 is equipped with a permanent magnet 16 arranged to co-operate with mercury-magnetic switches 17 and 18. The switches are located in positions such that the magnet operates the switch 17 as the pointer approaches a zero indicium 19 of the chart 14 and operates the switch 18 when the indicator 13 reaches the zero indicium 19.

The automatic load counterbalancing mechanism is arranged to rotate the indicator 13 from its full scale position toward zero as the load applied to the steelyard rod 6 increases. With no load in the hopper 1 and with the poises 11 and 12 located at the left ends of the beams 9 and 10 the mechanism is adjusted so that the pendulums are in their elevated position (or if a spring, so that the spring is extended) and the indicator 13 stands at zero. To condition the scale for the production of a certain batch weight the poises 11 or 12 or both are moved to the right on the beams 9 and 10, thereby decreasing the load applied to the automatic counterbalancing mechanism and causing the indicator to rotate clockwise to indicate on the chart 14 the decrease in load counterbalanced by the poises as a result of moving them to the right. As load is added to the hopper 1 the force through the steelyard rod 6 increases, the pendulums rise, and the indicator returns toward its zero position. Actually the indication on the annuar chart 14 represents the amount by which the weight of the load in the load receiver or hopper 1 fails to equal the required load as predetermined by the positioning of the poises 11 and 12.

The mercury-magnetic switches 17 and 18 through electric relays control a vibratory feeder 20 arranged to feed material from a supply bin 21 to the hopper or load receiver 1.

A second ingredient for the batch to be produced is received in a second load receiver hopper 22 that is pivotally suspended from a knife edge 23 mounted in a carrier 24 that is slidable along a lever 25 fulcrumed on a pedestal 26. The lever 25 has a power pivot 27 pivotally engaged in a stirrup 28 on the bottom end of a steelyard rod 29 of a second weighing scale mechanism 30.

The weighing mechanism 30 comprises an automatic load counterbalancing mechanism enclosed within a dial housing 31 and arranged to drive an indicator 32 according to the load being counterbalanced. The scale mechanism 30 also includes a pair of beams 33 and 34 on which are mounted poises 35 and 36 arranged to counterbalance or offset part of the load force transmitted through the steelyard rod 29. An adjustable stop 37 is arranged to limit the movement of the tip of the beams 33 and 34 at a point such that the indicator 32 cannot rotate counterclockwise substantially beyond its zero or balance position. When at the balanced or zero position, a permanent magnet 38 mounted on an arm 39 of the indicator 32 co-operates with a mercury-magnetic switch 40. As the load on the steelyard rod 29 decreases the indicator 32 is driven clockwise around the dial so as to indicate the amount of unbalance. As the indicator 32 rotates clockwise in response to decrease in load on the steelyard rod 29, the magnet 38 co-operates with a second mercury-magnetic switch 41 after leaving the first switch 40 and upon still further decrease in load leaves the second switch 41. The switches 40 and 41 through relays control the flow of power to a vibratory feeder 42 arranged to feed material from a supply bin 43 to the second weigh hopper 22.

The lever 25 supporting the second weigh hopper 22 has still another pivot 44 engaging the lower end of a steelyard rod 45 the upper end of which is supported on a pivot 46 at the end of the floating lever 4.

In this arrangement forces from the load receiver 1 transmitted through the floating lever 4, fulcrumed on the steelyard rod 6, are transmitted through the steelyard rod 45 to the lever 25 to offset loads applied to the hopper or load receiver 22. Thus while the load in the load receiver 22 tends to pull the steelyard rod 29 down and to rotate the indicator 32 counterclockwise, the force of load in the first load receiver or hopper 1 transmitted through the floating lever 4 urges the lever 25 upwardly in opposition to the load in the hopper 22 thus tending to drive the indicator 32 clockwise to indicate a deficiency of weight in the hopper 22.

The effective lever ratio of the hopper 1 with respect to the fulcrum pivot 5 is fixed by the distance between the pivots 3 and 5. The effective lever ratio of the hopper 22 with respect to the fulcrum pivot 5 is determined by the position of the carrier 24 on the lever 25 and the distance from the pivot 46 of the lever 4 to the fulcrum pivot 5. In the arrangement shown wherein the lever 4, as a first class lever, has a ratio of 3½ to 1 a tension force of one unit in the steelyard rod 45 offsets 3½ units in the hopper 1. Likewise a tension force of one unit in the steelyard rod 45 offsets about 1½ units in the hopper 22. Therefore, in the arrangement shown the system will be in balance with the indicator 32 indicating zero if the load in the hopper 1 is to the load in the hopper 22 as 3½ is to 1½, i. e., 7 to 3.

If it is desired to increase the quantity of material fed into the hopper 22 in proportion to the material fed into the hopper 1 the carrier 24 is moved along the lever 25 toward the fulcrum of that lever, which rests on the pedestal 26. Likewise if the proportion of the material fed into the hopper 22 per batch is to be decreased the carrier 24 and the suspended hopper 22 are moved (to the right in Figure I) toward the tip of the lever 25.

The feeder control mechanism for this system is arranged such that after the poises 11 and 12 have been set according to the desired batch weight, material is rapidly fed from the bin 21 through the feeder 20 into the hopper 1. As material flows into the hopper 1, forces from the weight of that material are transmitted through the steelyard rod 6 to indicate the quantity of material and also through the steelyard rod 45 to the lever 25 and hopper 22 tending to raise the lever 25 thus driving the indicator 32 clockwise away from zero. As this occurs the feeder 42 is energized by circuits controlled through the mercury-magnetic switches 40 and 41 to initiate feeding of material from the supply bin 43 across the second feeder 42 and into the second hopper 22. If during the time that material is fed into the hopper 1 the weight of material in the hopper 22 approaches or equals the predetermined percentage of the weight in the hopper 1 the indicator 32 approaches zero and by the co-operation with the switches 41 and 40 slows or stops the feeder 42 to prevent the accumulation of an excess of material in the hopper 22. As additional material flows into the hopper 1 the condition of balance is again upset and the second weighing mechanism 30 through the switches 40 and 41 re-energizes the feeder 42 to supply material to the hopper 22 thus tending to restore the condition of balance.

When the quantity of material in the hopper 1 approaches the desired weight the indicator 13 of the scale 7 approaches zero and through its co-operation with the mercury-magnetic switches 17 and 18 first slows down the action of the feeder 20 and then, as the indicator reaches zero, stops the feeder 20. If at this time the load in the second load receiver 22 is the correct percentage of the load in the receiver 1 the indicator 22 of the second scale 30 also stands at zero and the system is de-energized. If the load in the second receiver is too low the scale 30 is unbalanced and the feeder 42 continues to operate until the indicator 32 returns to zero.

Control circuits for carrying out this operation are illustrated in Figure II of the drawings. This operation may be followed by considering the wiring diagram, Figure II, in combination with the mechanical system shown in Figure I and assuming that both hoppers 1 and 22 are empty, that the poises 11 and 12 have been positioned to desired weight, and that the indicator 13 stands at a point on the chart 14 indicating the desired batch weight. Then, referring to Figure II, a start button 50 is manually depressed so that current may flow from a source of control power through a stop button 51, a lead 52, and the now closed start button 50 to a control power lead 53. From the lead 53 current flows to a branch lead 54, normally closed contacts 55 of a stop relay 56, an operating coil of a holding relay 58, and through a return lead 59 to a return control power lead 60. In response to this current flow the holding relay 58 closes its contacts 61 to complete a shunt circuit from the lead 52 through a lead 62, the now closed contacts 61 and a lead 63 through the lead 54 connected to the control power lead 53. This shunt circuit permits the start button 50 to be released without de-energizing the control lead 53.

As soon as the start button 50 was depressed and as long as the holding relay 58 maintains a shunt circuit or bypass around the start button 50 from the lead 52 to the control lead 53, a power relay 64 closes its contacts 65 so that power may flow from power lines 66 through the now closed contacts 65 to leads 67 and 68 supplying power to the vibratory feeders 20 and 42. The feeders may or may not operate although the relay 64 is energized depending upon whether or not the loads on the weighing scales, acting through the mercury-magnetic switches call for operation of the feeders or not. Under the assumed conditions of no load in the hopper 1 and the indicator 13 displaced from zero the mercury-magnetic switches 17 and 18 are both open. Furthermore, current may flow from the control power lead 53 through a lead 69, a normally closed contact 70 of a final cutoff relay 71, a lead 72, an operating coil of a vibrator control relay 73 and a return lead 74 connected to the return control power lead 60. Current flow through the operating coil of the vibrator control relay 73 causes it to close its contacts 75 so that current may flow from the power lead 68, through the now closed contacts 75 and a lead 76, through a normally closed contact 77 of a first cutoff relay 78, and then through a lead 79 to a vibrator motor 80 of the vibrator feeder 20. From the vibrator motor 80 current returns through a lead 81 to the return power lead 67. Thus energized, the vibratory conveyor 20 feeds material into the hopper 1 and the increase in weight thereof is indicated by the weighing scale indicator 13 rotating counterclockwise toward its zero load position. As it approaches its zero load position the magnet 16 reaches the first mercury-magnet switch 17 and closes it so current may flow from the control power lead 53 to a branch lead 82, the now closed mercury-magnetic switch 17 and a lead 83, through an operating coil 84 of the first cutoff relay 78, and through a lead 85 connected to the return control power lead 60. The relay 78, thus energized, opens its normally closed contacts 77 and closes a first pair of normally open contacts 86 to complete a circuit from the control power lead 53 through the now closed contacts 86 to the lead 83 thus shunting the mercury-magnetic switch 17 and sealing the relay 78 in its energized position.

The opening of the normally closed contacts 77 as the first cutoff relay 78 is operated forces the vibrator motor current to flow through a resistor 87 connected in parallel with the contacts 77 so as to reduce the speed of the vibratory motor 80. Upon further increase in load, now occurring at a low speed, the indicator 13 continues its approach toward zero and as it reaches zero operates the second mercury-magnetic switch 18 to complete a circuit from the power lead 53 and branch lead 82 through the now closed switch 18, lead 88, now closed contacts 89 of the first cutoff relay 78, to an operating coil 90 of the final cutoff relay 71. As the relay 71 operates it opens its normally closed contacts 70 to de-energize the vibrator control relay 73 thus stop the vibrator motor 80 and at the same time closes its normally open contacts 91 to complete a circuit from the control power lead 53 through the now closed contacts 91 to electrically seal the final cutoff relay 71 in its energized condition. This completes the cycle of operation for a batch in-so-far-as the hopper 1 and weighing mechanism 7 for the first material are concerned and this condition is indicated by the relay 71 closing a pair of normally opened contacts 92 to energize a lead 93 leading to that portion of the control circuit relating to the second weighing scale mechanism 30.

At the start of the weighing operation and before any material is fed into the hoppers the indicator 32 of the second weighing mechanism 30 stands at zero so that the mercury-magnetic switch 40 was closed. As long as the switch 40 is closed current can flow from the power lead 53 through a lead 94, the now closed mercury-magnetic switch 40, a lead 95 and operating coil 96 of a slow-speed cutoff relay 97 and a lead 98 connected to the return control power lead 60. As long as this circuit is complete the relay 97 holds its normally closed contacts 99 open and its normally open contacts 100 closed. As long as the contacts 99 are open no current can flow from the power lead 68 to the second vibratory feeder 42.

As load is added to the first hopper 1 and the weighing system becomes unbalanced the indicator 32 of the second scale leaves its zero position to close the other mercury-magnetic switch 41 and shortly thereafter open the first mercury-magnetic switch 40. As the switch 40 opens and de-energizes the relay 97, the normally closed contacts 99 are closed so that current may flow from the lead 68 to a lead 101 leading to contacts 102 of a fast speed control relay 103. The contacts 102 are open at this time because the indicator has moved so that its magnet 38 co-operates with the second mercury-magnetic switch 41 thereby completing a circuit from the energized lead 94 through the now closed switch 41, lead 104, operating coil 105 of the relay 103, and a return lead 106. As long as the relay 103 is thus energized and the relay 97 is de-energized current may flow from the lead 68, through the contacts 99, through the lead 101, a resistor 107, and a lead 108 connected to a vibrator motor 109 of the vibratory feeder 42. The vibrator motor 109 is also connected to the return power lead 67. This current flow causes the motor 109 to operate at slow speed.

As the unbalance condition increases because of further rapid addition of load to the hopper 1, the indicator 32 rotates still further in a clockwise direction so that the second mercury-magnetic switch 41 is opened thus breaking the circuit to the relay 103 thereby closing the contacts 102 to complete a by-pass circuit through a lead 110 around the resistor 107 so that full power is applied to the vibrator motor 109 and the vibratory feeder 42 operates at full speed.

For best operation the full feeding speed of the vibratory conveyor 42 is such that the hopper 22 is filled to its desired weight before the hopper 1 receives its full load. In other words material is fed to the hopper 22 at a rate more than sufficient to maintain balance in the lever system. As the load in the hopper 22 gains on the load in the hopper 1 the indicator 32 approaches zero and its magnet 38 co-operates with the second mercury-magnetic switch 41 to energize the relay 103 and thus break the by-pass circuit around the resistor 107 so that the vibratory feeder 42 operates at slow speed. Actually the control fluctuates between its fast and slow speed condition as the load in the hopper 22 is maintained at slightly less than the desired percentage of the load in the hopper 1. The amount by which the load in the hopper 22 fails to match the load in the hopper 1 depends upon the force required to rotate the indicator 32 to a position where the mercury-magnetic switch 41 is just operated or just released.

After the first weighing mechanism has filled the hopper 1 to the desired weight and has energized the control lead 93 the current may flow from the lead 93 through a continuing lead 111 and contacts 112 to the lead 104 to hold the relay 103 closed so that the vibratory feeder 42 can no longer be operated at high speed even though the mercury-magnetic switch 41 is opened.

Since the hopper 1 has received its load and its control is de-energized, its weight remains constant and the continuing dribble feed resulting from slow speed operation on the vibratory feeder 42 finally brings the weight of the second weigh hopper 22 to the point where the indicator 32 returns to its zero position and operates the first mercury-magnetic switch 40. This energizes the relay 97 so as to break the contact 99 and thus stop the feeder 42. At this time both of the hoppers 1 and 22 have received their full loads and this is indicated in the control circuit by the completion of the circuit from the lead 93, which was energized when the hopper 1 reached its desired net weight, through the contacts 100, which were closed by the relay 97 when the second hopper 22 reached its correct weight, to a lead 113 connected to an operating coil 114 of the stop relay 56 connected through lead 115 to the return lead 93. The relay 56 thereupon opens its contacts 55 thus interrupting the current flow to the relay 58 so that it releases its contacts 61 to interrupt the flow of power to the control power lead 53 and thus de-energizes the complete system.

This completes the cycle of filling and the material in the hoppers 1 and 22 may be discharged into a common container or mixer with the assurance that the ingredients are in the correct proportion by weight. Since the final cutoff of the flow of material into the hopper 22 is determined by the condition of balance between the loads in the hoppers 1 and 22, any error in arriving at the correct weight in the hopper 1 does not affect the proportionality of the weights. Therefore if one of the materials is chunky or hard to feed it may be fed into the hopper 1 in such quantities as may be convenient and without particular attention to arriving at an exact weight. The easily fed material is fed through the feeder 42 to the hopper 22 where an accurate cutoff may be maintained to assure exact proportionality of the weights of the materials.

It occasionally happens that three or more ingredients are required in a batch and that these ingredients must be included in definite percentages according to weight even though the total batch weight may vary over a wide range. While the system previously described can readily proportion two ingredients for a batch it cannot be used for more than two. The principle of the system may be extended to a plurality of ingredients and in the extended system a first ingredient, which may be the one that is difficult to feed, is employed as a counterbalance in a weighing system for weighing out the second and other ingredients. A lever system suitable for three ingredients is illustrated in Figure III. In this system the first ingredient for a batch is fed into and collected in a first hopper 120 pivotally suspended at the end of a first arm 121 of a first floating lever 122. The floating lever 122, which is of the first class, is fulcrumed on a lower end of a steelyard rod 123 connected to a first weighing mechanism 124. This much of the system is identical to the hopper 1 and the weighing mechanism 7 illustrated in Figure I. A second arm 125 of the floating lever 122 is connected through a steelyard rod 126 to support the fulcrum of a second floating lever 127 also of the first class. A first arm 128 of the second floating lever 127 is pivotally connected through a steelyard rod 129 to a first second-class lever 130 which is fulcrumed on a pedestal 131. The tip end of this second-class lever 130 is operatively connected to the second counterbalancing mechanism 132 which is adapted to indicate the condition of balance or the amount of unbalance of the second-class lever 130. A second load receiver or hopper 133 is pivotally suspended from a carrier 134 slidably mounted on the first second-class lever 130. It will be noted that the second-class lever 130 and the counterbalancing mechanism 132 along with the load receiver 133 corresponds to the second weighing mechanism 30 and hopper 22 illustrated in Figure I except that the arm 128 of the second floating lever 127 is included between the first second-class lever 130 and the first floating lever 122.

A second arm 135 of the second floating lever 127 is connected through a steelyard rod 136 to a second second-class lever 137 fulcrumed on a second pedestal 138. The tip of the second second-class lever 137 is pivotally connected to and supported by a third load counterbalancing mechanism 139 adapted to indicate the direction and amount of unbalance of the forces applied to the second second-class lever 137. A third load receiver or hopper 140 is pivotally supported from a carrier 141 that is mounted for adjustment along the length of the second second-class lever 137. In this arrangement the magnitude of the load in the first hopper 120 is indicated on the dial of the first weighing mechanism 124. A force proportional to the weight in the first hopper 120 is transmitted through the floating lever 122 and the steelyard load 126 to the second floating lever 127 where it is divided and a part transmitted to the first second-class lever 130 and a part transmitted to the second second-class lever 137. The division of force between the two second-class levers depends upon the ratio of the second floating lever 127. The forces transmitted through the steelyard rods 129 and 136 from the second floating lever 127 act as counterforces to counterbalance the weight of material added to the hoppers 133 and 140. The condition of balance, i. e. the loads in the hoppers 133 and 140 compared to the force transmitted through the steelyard rod, which is, in turn, proportional to the load in the first hopper 120, is indicated by the weighing mechanisms 132 and 139.

The electrical control for automatically filling the hoppers operates in much the same manner as the control illustrated in Figures I and II. In this control the first weighing mechanism 124 operates as an ordinary batching control scale to fill the first hopper 120 to a weight selected by the counterbalancing portion of the first weighing mechanism 124. This control determines the size of the batch. Simultaneously, controls operated by the second and third counterbalancing mechanisms 132 and 139 feed material to the hoppers 133 and 140 and continuously maintain the weight in these hoppers generally in proportion to the weight in the hopper 120. Therefore the second and third hoppers 133 and 140 are loaded in amounts that are proportional to the load in the first hopper 120 regardless of the magnitude of that load.

Figure IV is a schematic wiring diagram to show the additional circuits required to replace a portion of the circuit illustrated in Figure II when the control is to operate with three scales and three ingredients. Since the control for the weighing mechanism 124 is the same as the control for the weighing mechanism of Figure I that portion of the diagram in Figure II appearing to the left side and including the leads 79 is not repeated in the diagram of Figure IV and Figure IV is to be considered as replacing the right half of Figure II with the leads indicated with prime reference numerals being connected to the correspondingly numbered but unprimed leads in Figure II leading from the left to the right portion of the diagram.

Referring now in particular to Figure IV and assuming that a weighing operation has been started and some material fed into the hopper 120, the lever system is unbalanced and the indicator of the second weighing mechanism, which co-operates with a pair of mercury-magnetic switches 150 and 151 moves away from zero to allow both switches to open. The co-operation of the indicator and the switch 151 is such that the switch 151 is closed when the weighing mechanism 132 indicates that the first second-class lever is in balance and is opened as soon as a change in balance occurs. The indicator also co-operates with the other switch 150 so that this switch is closed when the indicator stands near the zero or balanced position and for a short distance in the direction such that the load in the second hopper 133 is less than the desired amount. Since the load in the hopper 120 is increasing because of the operation of the circuit shown in Figure II the indicator of the weighing mechanism 132 leaves its zero position and opens the mercury-magnetic switches 150 and 151. Under this condition current may flow from the vibrator motor supply lead 63' through a lead 152, normally closed contacts 153 of a final cutoff relay 154, through a lead 155, normally closed contacts 156 of a slow feed relay 157 and through a lead 158 to a vibrator motor 159 of a vibratory feeder 160 feeding material to the hopper 133. The return side of the vibrator motor 159 is connected to the power return lead 67'. Under this condition with both the switches 150 and 151 open and the relay 154 de-energized the vibratory feeder 160 operates at full speed to deliver material to the hopper 133. As the weight in the hopper approaches the correct value and the indicator of the weighing mechanism 132 indicates this condition the indicator operates the first of the mercury-magnetic switches 150 to permit current to flow from the energized control lead 94' through the switch 150, a lead 161, and operating coil 162 of the relay 157, and a return lead 163 to the return control power lead 98'. The relay 157 opens its contacts 156 which are in parallel with a resistor 164 so that the current flow to the vibrator motor 159 is reduced and the vibratory feeder 160 operates at slow speed.

Since the load in the first hopper 120 is still increasing, the slow speed of the feed to the hopper 133 is not enough to keep the weighing mechanism in approximate balance and as the unbalance increases, the magnet on the indicator releases the mercury-magnetic switch 150 thereby opening the circuit to the slow feed relay 157 which when released permits the vibratory feeder 160 to operate at full speed. This operation at fast and slow speed continues until the first weighing mechanism 124 indicates that the load in the hopper 120 has reached the correct value. When this occurs and the control for the first weighing scale 124 is de-energized a circuit is completed to the lead 93 of Figure II, the lead 93' of Figure IV, so that the next time the switch 150 is operated as the first second-class lever 130 approaches balance and the relay 157 is energized current flows from the lead 93' through the normally open contacts 165 of the relay 157 to complete a circuit in parallel with the mercury-magnetic switch 150 and thus electrically seal the relay 157 in its energized condition. This prevents the control mechanism for the feeder 160 returning to high speed operation should the mercury-magnetic switch 150 be opened.

As the slow speed feed of material to the hopper 133 brings its weight to the desired value the indicator of the weighing mechanism 132 operates the second mercury-magnetic switch 151 so that current may flow from the energized control lead 94' through the now closed mercury-magnetic switch 151, lead 166, and operating coil 167 of the final cutoff relay 154 to the return control power lead 98'. Thus energized the cutoff relay 154 opens its contacts 153 thus stopping the action of the vibratory feeder 160 and at the same time indicating this condition by closing its contacts 168 so current may flow from the signal lead 93' through the contacts 168 to energize a continuing signal lead 169.

The third counterbalancing mechanism 139, which is operatively connected to the second second-class lever 137 supporting the third hopper 140, is equipped with first and second mercury-magnetic switches 170 and 171. These switches co-operate with relays to operate a vibratory feeder 160a to feed material into the hopper 140. Inasmuch as these circuits are identical in structure and operation with the circuits co-operating with the weighing mechanism 132 the description of that circuit will not be repeated but the description may be applied to the circuits of the weighing mechanism 139 by replacing each of the reference numerals with the same reference number followed with an "a."

There is one portion which must be separately considered and that is the connection of the signal lead 169 through contacts 168a the final cutoff relay 154a to the signal lead 113' when the controls indicate that the second second-class lever 137 is in balance following the addition of weight to all of the hoppers.

As will be recalled from Figure II, as soon as the signal lead 93' is connected through to the lead 113' current flows through the relay 56 to break the circuit of the sealing relay 58 and thus de-energize the entire system.

The application of this system of proportioning batch materials by using the weight of one material as a counterforce may be extended indefinitely by following the same method of extension as was used in extending the lever system shown in Figure I to the system shown in Figure III and including control circuits for each similar to the control circuit shown in Figure II and its extension as shown in Figure IV.

Various modifications of the structure and circuit may be made without departing from the scope of the invention.

Having described the invention, I claim:

1. In a device of the class described, in combination, a load receiver, a lever system serving to support the load receiver, a first and a second load counterbalancing mechanism each operatively connected to the lever system, a second load receiver, a lever that connects the second load receiver to the second load counterbalancing mechanism and that transmits to the first counterbalancing mechanism a selectable fractional part of the load force of the second load receiver in opposition to the force transmitted to the second counterbalancing mechanism by load in the first load receiver, feeders for feeding material into said load receivers, and a control system that is responsive to the counterbalancing mechanisms for controlling the feeders.

2. In a device of the class described, in combination, a load receiver, a lever system serving to support the load receiver, a first and a second load counterbalancing mechanism each connected to the lever system to jointly counterbalance the load in said receiver, a second load receiver, a variable ratio lever system for connecting the second load receiver to the second counterbalancing mechanism to offset the load force from the first load receiver, a feeder for each load receiver, a control system including the first load counterbalancing mechanism for operating the first feeder for feeding material into the receiver until a selected weight is reached, and a control system including the second load counterbalancing mechanism for operating the second feeder to maintain a sufficient quantity of material in the second load receiver to offset the load force of the first receiver applied to the second counterbalancing mechanism, whereby the loads in the receivers are maintained at a predetermined ratio of weight at the time of final weighing.

3. In a device of the class described, in combination, a load receiver, a lever system serving to support the load receiver, a plurality of load counterbalancing mechanisms each connected to the lever system to counterbalance a predetermined part of the load, other load receivers, a variable ratio lever system for connecting the other load receivers to certain of the counterbalancing mechanisms for applying the load forces of said other receivers to the counterbalancing mechanism in opposition to the force of the first load receiver, a plurality of mercury-magnetic switches mounted in the counterbalancing mechanisms, a feeder for each load receiver for feeding material thereto, and circuit means responsive to the mercury-magnetic switches for controlling the feeders.

4. In a device of the class described, in combination, a first load receiver, a lever system serving to support the load receiver, at least two load counterbalancing mechanisms operatively connected to the lever system, at least one other load receiver, a lever system for transmitting load forces from each of said other load receivers to a corresponding one of said load counterbalancing mechanisms to apply force in opposition to the force transmitted from the first load receiver, control means sensitive to the condition of balance of each load counterbalancing mechanism, and a feeder for each load receiver, each feeder being under the control of the control means associated with the corresponding load counterbalancing mechanism.

5. In a device of the class described, in combination, a first load receiver, a lever system that supports the load receiver, a plurality of load counterbalancing mechanism operatively connected to said lever system, a second load receiver, a lever system for supporting the load receiver and transmitting load force to one of the load counterbalancing mechanisms in opposition to force from the first load receiver, a feeder for each load receiver, and a control system for each feeder, the control system for the first load receiver serving to stop the feeding of material when a predetermined quantity of material has accumulated in the first receiver, the control system for the feeder for the second load receiver serving to feed material as long as that load counterbalancing mechanism indicates a lack of balance between the weights in the receivers.

6. In a device of the class described, in combination, a first load receiver, a lever system that supports the load receiver, a plurality of load counterbalancing mechanisms operatively connected to the lever system, a plurality of other load receivers there being one load receiver for each load counterbalancing mechanism, a plurality of lever systems, one for each of the other load receivers, said lever systems being connected to the load counterbalancing mechanisms in opposition to the lever system supporting the first load receiver, a feeder for feeding material to each load receiver, a control system for each feeder, each control system including a portion sensitive to unbalance of the associated load counterbalancing mechanism and being adapted to feed material whenever an unbalance occurs, an electrical contact in each control system that is closed when there is no unbalance, and a circuit including said contacts for de-energizing all the control systems when they simultaneously indicate a balanced condition.

7. In a device of the class described, in combination, a first load receiver, a lever system that supports the first load receiver, a load counterbalancing mechanism operatively attached to the lever system, a plurality of other load receivers, a plurality of lever combinations for supporting each of the other load receivers respectively, a force transmitting connection from each of the lever combinations to the lever system whereby the load in the first load receiver serves as a counterbalance for loads in the other receivers, balance indicators connected respectively to each lever combination, and control means responsive to said force balance indicators for feeding material to the other load receivers.

MARK A. WECKERLY.

References Cited in the file of this patent

UNITED STATES PATENTS

| Number | Name | Date |
| --- | --- | --- |
| Re. 21,169 | McCrery | Aug. 1, 1939 |
| 591,657 | Moser | Oct. 12, 1897 |
| 1,297,595 | Riley | Mar. 18, 1919 |
| 2,066,012 | McCrery | Dec. 29, 1936 |
| 2,343,000 | Carliss | Feb. 29, 1944 |
| 2,400,972 | Bell | May 28, 1946 |
| 2,559,308 | Martinson | July 3, 1951 |